Sept. 12, 1944.            LE ROY J. NELLIS            2,357,844
                              ELECTRODE HOLDER
             Filed March 18, 1943              2 Sheets-Sheet 1
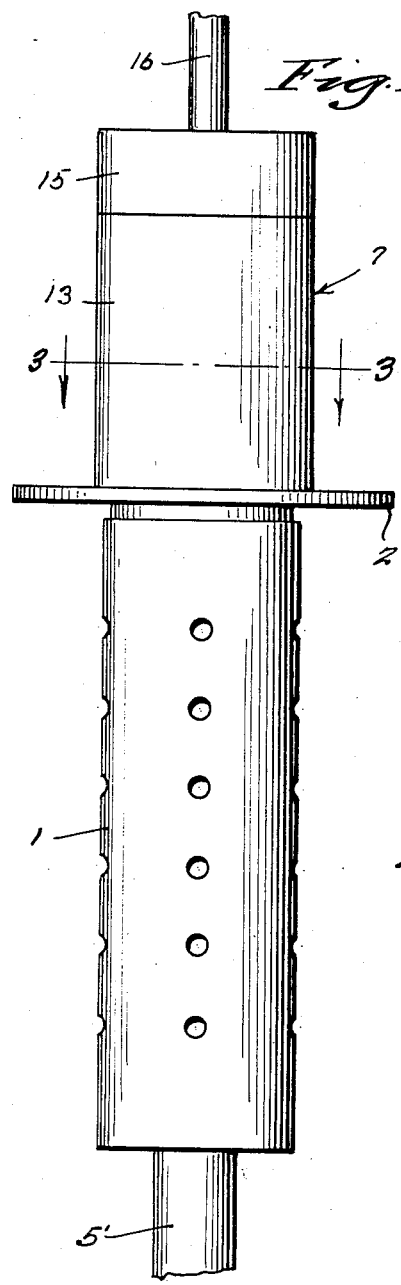
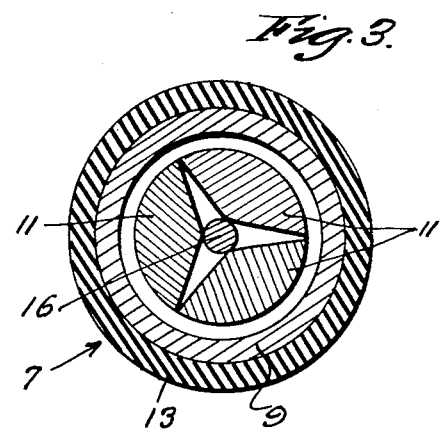
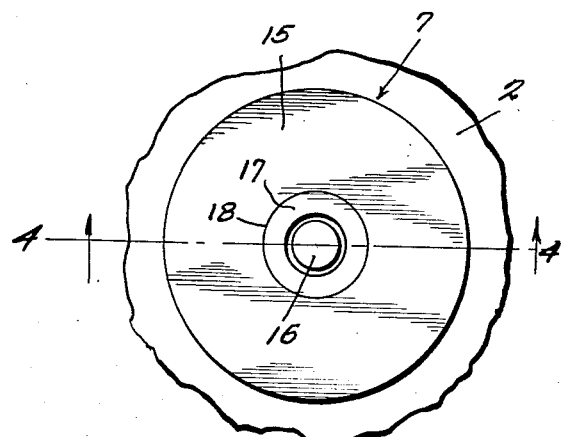
Inventor
Le Roy J. Nellis

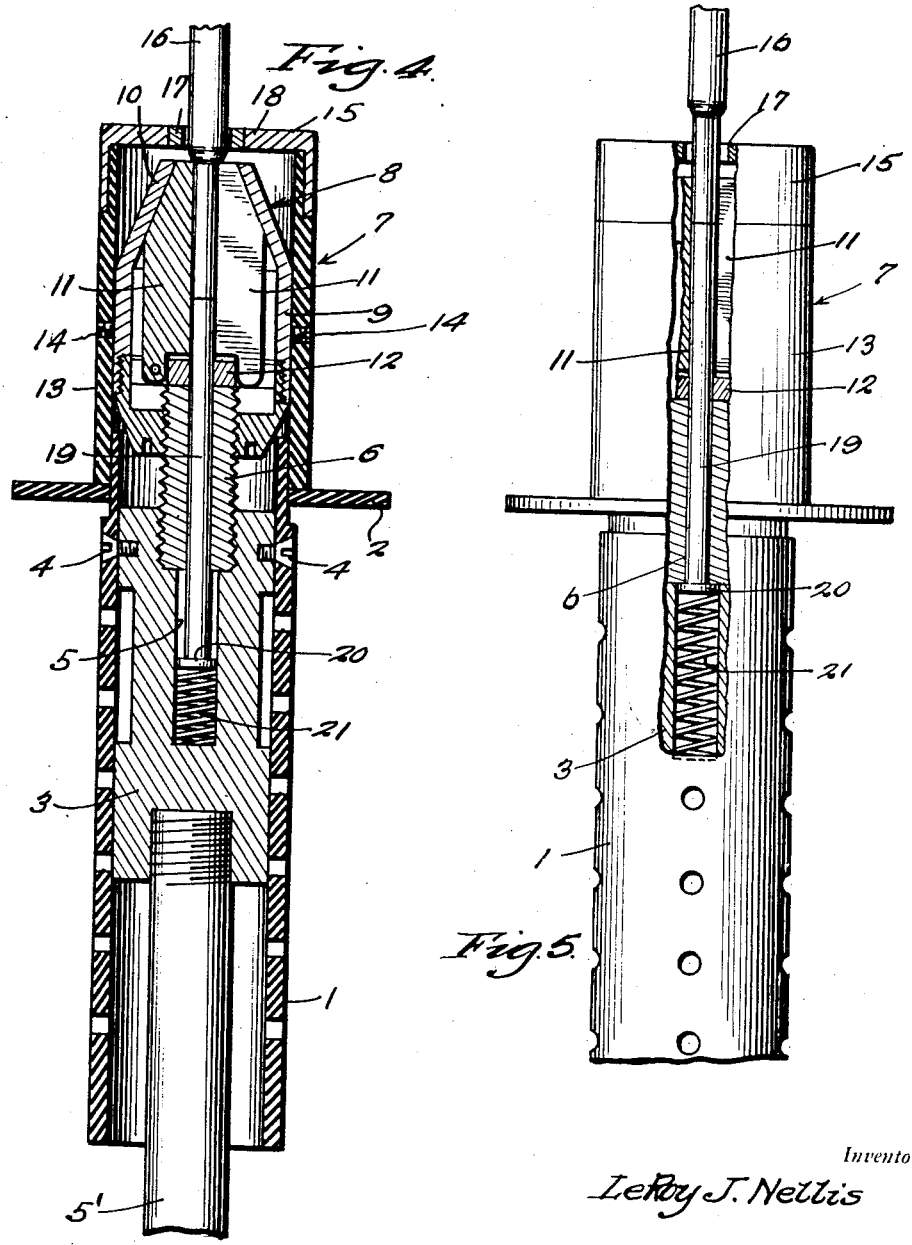

Patented Sept. 12, 1944

2,357,844

UNITED STATES PATENT OFFICE 2,357,844

ELECTRODE HOLDER

Le Roy J. Nellis, New Orleans, La.

Application March 18, 1943, Serial No. 479,622

1 Claim. (Cl. 219—8)

The present invention relates to new and useful improvements in holders for welding rods or electrodes, and has for one of its important objects to provide, in a manner as hereinafter set forth, a device of this character comprising a novel construction and arrangement for firmly gripping and securing the electrode.

Another very important object of the invention is to provide a holder of the aforementioned character which embodies unique means for ejecting the stub when the electrode has been consumed and is to be replaced.

Still another highly important object of the invention is to provide a holder of the character set forth comprising means for successfully resisting the burning flux from the welding electrode and wherein, further, the electrode securing elements are fully enclosed and protected for permitting said electrode to be burned closer to the holder.

Other objects of the invention are to provide a welding electrode holder of the character described which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is an elevational view of a welding electrode holder constructed in accordance with the present invention.

Figure 2 is an end view of the device.

Figure 3 is a sectional view, taken substantially on the line 3—3 of Figure 1.

Figure 4 is a view in longitudinal section through the holder.

Figure 5 is a fragmentary view broken away in section.

Referring now to the drawings in detail, it will be seen that the embodiment of the invention which has been illustrated comprises a tubular, perforated handle 1 of suitable insulating material. Mounted on the forward portion of the handle 1 is a guard 2, also of insulating material. A metallic core 3 is secured in the handle 1 by countersunk screws 4. A conductor cable 5' extends into the handle 1 and is anchored in the core 3 in any suitable manner.

The core 3 has formed longitudinally therein a counterbored socket 5. Threadedly mounted in the counterbored portion of the socket 5 and projecting longitudinally from the forward end of the core 3 is a tubular shank 6. A head 7 is threadedly mounted on the shank 6.

The head assembly 7 comprises a chuck 8 including a housing 9 which is threadedly mounted on the shank 6, said housing having a substantially conical forward end portion 10. A plurality of jaws 11 are pivotally mounted on a disk 12 in the housing 9. The disk 12 is slidable in the housing 9. The shank 6 projects into the housing 9 for engagement by the disk 12 for engaging the free end portions of the jaws 11 with the conical portion 10 of said housing for closing said jaws when the chuck 8 is screwed inwardly on said shank 6.

The head assembly 7 further includes a sleeve 13 of insulating material which is secured on the chuck 8 by set screws 14. A copper plate or cap 15 is mounted on the forward end portion of the sleeve 13. The plate 15 has formed therein a circular, centrally located opening which is longitudinally aligned with the jaws 11 and which accommodates the electrode, as at 16. An insulating bushing 17 is mounted in the opening 18.

An ejector 19 is slidably mounted in the shank 6 and operable longitudinally between the jaws 11 of the chuck 8 for engagement with the electrode 16. The ejector 19 extends into the socket 5 and is provided with a head 20 on its inner end. A coil spring 21 in the socket 5 is engaged with the head 20 for yieldingly urging the ejector 19 outwardly.

It is thought that the operation of the holder will be readily apparent from a consideration of the foregoing. Briefly, the head assembly 7 is screwed outwardly on the threaded shank 6 sufficiently to open the jaws 11 to accommodate the electrode 16. The electrode 16 is inserted between the jaws 11 and the plunger 19 is forced inwardly by said electrode in a manner to compress the coil spring 21. The head assembly 7 is then screwed inwardly or down on the threaded shank 6 for closing the jaws 11 on the electrode. In this manner the electrode is firmly clamped in the holder. When the electrode has been substantially consumed and is ready to be replaced, the assembly 7 is again screwed outwardly on the shank 6 for opening or loosening the jaws 11. The coil spring 21 then actuates the ejector 19 for expelling the stub from the chuck 8. The cap 15, being of copper, resists the burning flux from the electrode, also the electric arc. This is a highly important and desirable feature of the invention, as it permits the electrode to be burned closer to the holder, thus making for economy. The sleeve 13 and the copper cap 15 completely enclose and protect the chuck assembly 8 for preventing deterioration from the burning flux.

It is believed that the many advantages of a welding electrode holder constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

A welding electrode holder including a tubular handle of insulation material, a metallic core fixed in one end of the handle, a reduced tubular shank threaded into said core to extend axially therefrom forwardly of the handle, an ejector rod slidably mounted in said shank with a front end portion extending forwardly out of the same, said rod being spring loaded at its other end within said core, and a chuck including a housing threaded onto said shank forwardly of said handle for turning forwardly and rearwardly on the shank, a disc slidably mounted on said front end portion of the ejector rod to seat against the outer end of the shank, and jaws pivotally mounted on said disc for closing by turning of the housing rearwardly when the disc seats against said outer end of said shank.

LE ROY J. NELLIS.